W. E. DUNSTON.
AUTOMOBILE BUMPER.
APPLICATION FILED JAN. 30, 1922.
1,432,165.
Patented Oct. 17, 1922.
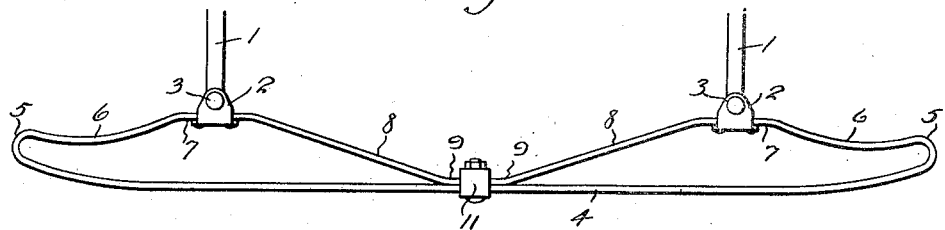
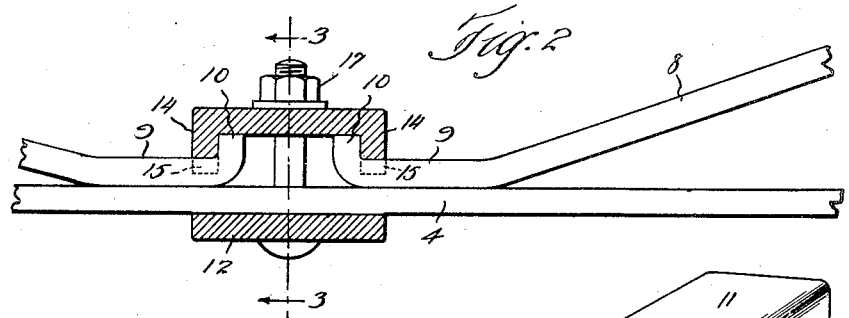
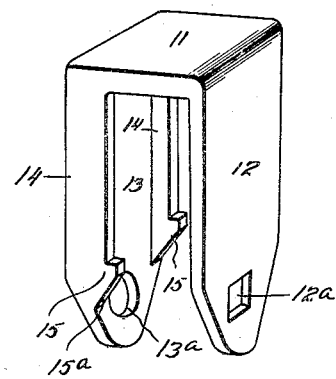
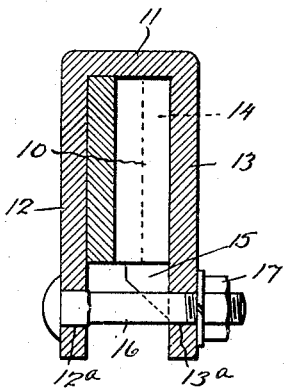
Inventor
Wayne E. Dunston,
By Hull, Brock & West,
Attys.

Patented Oct. 17, 1922.

1,432,165

UNITED STATES PATENT OFFICE.

WAYNE E. DUNSTON, OF KALAMAZOO, MICHIGAN, ASSIGNOR TO CHRISTIAN GIRL, OF KALAMAZOO, MICHIGAN.

AUTOMOBILE BUMPER.

Application filed January 30, 1922. Serial No. 532,567.

*To all whom it may concern:*

Be it known that I, WAYNE E. DUNSTON, a citizen of the United States, residing at Kalamazoo, in the county of Kalamazoo and State of Michigan, have invented a certain new and useful Improvement in Automobile Bumpers, of which the following is a full, clear, and exact description, reference being had to the accompanying drawings.

This invention relates to automobile bumpers, and more particularly to bumpers of the type comprising a front or impact section and a rear or attaching section having its central portion operatively connected with the central portion of the impact section, thereby to strengthen the said impact section. It is the object of the invention to provide a convenient and efficient means for so connecting the two parts or sections of a bumper and, at the same time, to secure a particularly efficient reinforcement of the impact section.

I accomplish the foregoing objects in and through the construction and arrangement of parts shown in the drawings forming part hereof, wherein Fig. 1 represents a plan view of a bumper constructed in accordance with and embodying my invention, together with the cooperating ends of the automobile side frame; Fig. 2 a detail in sectional plan of the central portion of the bumper and of the clamping means uniting the two sections thereof; Fig. 3 a sectional detail corresponding to the line 3—3 of Fig. 2; and Fig. 4 a detail in perspective of the clamping device.

Describing the various parts by reference characters, 1 denotes the ends of the side frames of an automobile and 2 are clamping members or clips pivotally connected to such ends, as indicated at 3. These clips or clamps may be of any desired construction such, for instance, as shown in my application No. 491,110, filed August 10, 1921, the purpose being to provide a pivotal mounting between the rear section of the bumper and the side frame members 1.

The bumper illustrated herein comprises a front or impact section 4, preferably of flat spring plate material, which front section is adapted to extend beyond the wheels (not shown). The spring plate 4 is preferably continuous and is bent to provide U-shaped end loops 5, thence being extended inwardly, as shown at 6, and provided with attaching portions 7 extending at substantially right angles to the members 1. The end portions of the spring plate are bent forwardly toward the front section, as indicated at 8, each bearing against the central portion of the front section, as shown at 9, and the extreme ends being bent rearwardly, as shown at 10.

Cooperating with the central portions of the front and rear sections and securing them together is a clamp, which is generally of inverted U-shape, comprising a central web 11 and depending legs 12 and 13. The leg 13 is provided at each lateral edge thereof with a rib 14 projecting toward the leg 12, the bottom of each rib 14 being provided with a shouldered projection 15 adapted to constitute a seat for the bottom of the cooperating portion 9 of the rear bumper section.

In securing the central portion of the front and rear sections together, the bottoms of the legs 12 and 14 will be sprung apart a sufficient distance to enable the clamp to be applied to the central portion of the bumper, the leg 12 bearing against the central portion of the plate 4 and the portions 9 of the rear section slipping over the shoulders 15, the bottoms of which are beveled, as indicated at $15^a$, to facilitate the application of the clamp to these parts. With the parts 9 above the shoulders 15, the legs 12 and 14 may be drawn together at their bottoms by means of a bolt 16 inserted through aligned openings $12^a$ and $13^a$ in the bottoms of said legs. The distance of the shoulders 15 from the lower surface of the web 11 is equal to the width of the cooperating portions 9 of the bumper plate while the ribs 14 are of a depth to receive therein the outturned ends 10 of the rear bumper section. It will be evident that, by setting up on the nut 17, the bottoms of the legs 12 and 13 will be drawn together and the portions 9 of the rear section will be forced tightly against the central portion of the front section.

The construction disclosed herein provides an economical and efficient connection for the central portions of the two bumper sections and secures a firm bearing between the central portion of the rear or attaching section and the corresponding portion of the front or impact section.

Having thus described my invention, what I claim is:

1. An automobile bumper comprising a central flat plate front section and a rear section having two opposed flat plates bearing against the central portion of the front section and having each a rearwardly directed end, and a clamping device applied to such ends and to the central portion of the front section and adapted to engage such ends, and means for drawing together the members of said clamping device thereby to force the bearing parts of the rear section against the central portion of the front section.

2. An automobile bumper comprising a central flat plate front section and a rear section having two opposed flat plates bearing against the central portion of the front section and having each a rearwardly directed projection, and a clamping device applied to such projections and to the central portion of the front section and adapted to engage such projections, and means for drawing together the members of said clamping device thereby to retain such projections and force the bearing parts of the rear section connected thereto against the front section.

3. An automobile bumper comprising a front section having a central portion of flat plate material and a rear section comprising two centrally arranged end portions each having a flat bearing portion adapted to engage the central portion of the front section and each having a rearwardly extending end, a U-shaped clamping member one leg of which is adapted to engage the front section and the other leg of which is adapted to engage the rearwardly extending ends of the rear section, and means for drawing the said legs together, thereby to secure a firm bearing between the central portions of the said bumper sections.

4. An automobile bumper comprising a front section having a central portion of flat plate material and a rear section comprising two centrally arranged end portions each having a flat bearing portion adapted to engage the central portion of the front section and each having a rearwardly extending projection, a U-shaped clamping member, one leg of which is adapted to engage the front section and the other leg of which is adapted to interlock with the rearwardly extending projections of the rear section, and means for drawing the said legs together, thereby to secure a firm engagement between the said member and the said projections and a firm bearing between the central portions of the said bumper sections.

5. An automobile bumper comprising a front section having a central flat portion and a rear section comprising two end portions each adapted to bear against the rear face of the front section on opposite sides of and adjacent to the center thereof and each having a rearwardly extending projection, and a U-shaped clamp applied to the central portion of said section and having therein seats for the rearwardly directed projections of the rear section and a portion adapted to engage such projections, and means for adjusting the clamping members toward each other thereby to force the central portions of the front and rear sections into rigid engagement.

6. A clamping device for securing together the central portions of the front and rear sections of a flat spring plate bumper, said device comprising a U-shaped member adapted to be slipped over the central portions of the bumper member, one of the branches of said member having adjacent each lateral edge thereof a rib projecting toward the other branch of said member, and each of said ribs having a shoulder at the bottom thereof, the said branches extending beyond the said shoulders, and a bolt connecting such extensions.

7. A clamping device for securing together the central portions of the front and rear sections of a flat spring plate bumper, said device comprising a U-shaped member adapted to be slipped over the central portions of the bumper member, one of the branches of said member having ribs projecting toward the other branch of said member, and a bold connecting such extension.

8. A clamping device for securing together the central portions of the front and rear sections of a flat spring plate bumper, said device comprising an intermediate plate and legs extending from said plate in substantially U-shape, one of said legs having seats for the rearwardly extending ends of one of the bumper sections, and means for connecting and adjusting the said legs.

In testimony whereof, I hereunto affix my signature.

WAYNE E. DUNSTON.